United States Patent

Suzuki et al.

[11] Patent Number: 5,304,879
[45] Date of Patent: Apr. 19, 1994

[54] OUTER ROTOR MOTOR

[75] Inventors: Yuzuru Suzuki, Sizuoka; Sakae Fujitani, Hamamatsu; Masaaki Inagaki, Sizuoka, all of Japan

[73] Assignee: Minebea Kabushiki-Kaisha (Minebea Co., Ltd), Nagano, Japan

[21] Appl. No.: 986,581

[22] Filed: Dec. 7, 1992

[30] Foreign Application Priority Data

Dec. 7, 1991 [JP] Japan .................. 3-108944[U]
Dec. 7, 1991 [JP] Japan .................. 3-108945[U]

[51] Int. Cl.$^5$ .................. H02K 11/00; G11B 23/00
[52] U.S. Cl. .................. 310/67 R; 360/133
[58] Field of Search .................. 310/67 R, 90, 91, 156, 310/89; 360/71, 133; 369/263, 269, 270; 384/490, 491

[56] References Cited

U.S. PATENT DOCUMENTS

| 4,779,156 | 10/1988 | Ohta | 360/132 |
|---|---|---|---|
| 4,812,937 | 3/1989 | Nemoto et al. | 360/133 |
| 4,851,731 | 7/1989 | Saotome et al. | 310/156 |
| 5,008,573 | 4/1991 | Beppu et al. | 310/89 |

Primary Examiner—Steven L. Stephan
Assistant Examiner—Matthew Nguyen
Attorney, Agent, or Firm—Fred Philpitt

[57] ABSTRACT

In an outer rotor motor (1): a hub base (3) is in a center of an upper side of the motor (1); a chucking magnet (16) for carrying a disk is near the hub base (3); a spindle (4) is fixed to a central hole of a rotor yoke which is provided with a permanent magnet (15) in its outer peripheral portion; the spindle (4) is supported by a bearing (5) fixed to a boss (7b) of a bearing housing (7) in which a ring-like rib (7c) is concentrically formed around the boss (7b) to form a circumferential groove (7d) therebetween and a hub of a stator (8) is mounted on the rib (7c); a leaf spring (12) is over the groove (7d) of the bearing housing placed under the base (3); and a drive pin (10) is fixed to a free end of the spring (12) to extend upward from the base (3) due to its resiliency through a hole of the hub base (3).

5 Claims, 7 Drawing Sheets 5,304,879

OUTER ROTOR MOTOR

BACKGROUND OF THE INVENTION

1. Field of the Invention

The present invention relates to a brushless DC outer rotor motor which is used as a spindle motor for driving a magnetic disk of a thin and small magnetic recording unit.

2. Description of the Prior Art

In a motor 21 which is shown in FIGS. 4 to 7 and rotatably drives a recording medium or disk such as magnetic disks, optical disks and like disks in a recording unit, there is provided a drive pin 10 on its hub base 3 adapted to be loaded with the disk.

The drive pin 10 engages with a reference hole formed in a hub portion of the disk, and is adapted to drive the disk upon energizing of the motor. As shown in FIG. 5, the drive pin 10 is mounted on a free end of a leaf spring 12 which has its base portion fixedly mounted on an lower surface of the hub base 3 by means of screws and like fasteners, thus allowing the leaf spring 12 to urge the drive pin 10 to extend above the upper surface of the hub base 3 or disk-loading surface side through a through-hole 13 formed in the hub base 3.

When the disk is set in a reference position of the hub base 3, the drive pin 10 enters the reference hole of the disk to engage with the disk. However, when the disk is set in any other position of the hub base 3 except the reference position thereof, the drive pin 10 receives the weight of the disk and is depressed thereby so that the leaf spring 12 is resiliently pushed towards the lower side of the hub base 3 against its resiliency, as shown in FIG. 4 by a dotted line.

In operation, since the hub base 3 is rotatably driven when the motor is energized, it is necessary to provide a space for permitting the leaf spring 12 to pass therethrough when the disk is set in any other position except the reference position, the space being provided under the lower side of the hub base 3. Due to the above reason, the hub base 3 is not directly provided in the rotor yoke 2 of the motor, but fixedly mounted on an end portion of a rotary shaft or spindle 4, the end portion being on the opposite side from the rotor yoke 2.

The reason why the hub base 3 is not mounted on the rotor yoke 2 is that although the housing 22 for the bearings 5 for the supporting the spindle 4 of the motor is press-fitted to an inner one 9a of inner and outer double hubs 9a, 9b formed in the central portion of a stator 8, it is not possible to provide an ample space between the front ends of vertical needle terminals 17 and the inner surface of the rotor yoke 2, and therefore the free end of the leaf spring 12 is prevented from easily passing therebetween when the disk is set in any other position except the reference position. Because in the space between the inner and outer double hubs 9a, 9b, there are provided various parts such as the vertical needle terminals 17 connected with wires leading to coils 14 of the stator's pole plates, as shown in FIGS. 6 and 7, such ample space can not be provided therebetween.

When the space between the front ends of the vertical needle terminals 17 and the inner surface of the rotor yoke 2 is increased, it is possible for the thus resiliently bent leaf spring 12 to pass therebetween. However, this poses the problem of requiring the motor to have a large height, which makes it impossible to use a motor with a thin thickness.

Further, in the motor of the recording unit, there are provided an indexing magnet in the rotor yoke 2 of the motor for detecting a reference starting position in recording of the disk and a magnetic detection device (which is constructed of a Hall device for detecting the indexing magnet) on a printed board.

In a conventional motor 21, as shown in FIGS. 14 and 15 the indexing magnet 19 is mounted on an outer peripheral surface of the rotor yoke 2 of the motor 21 and the magnetic detection device 20 is fixedly mounted on the printed board 18 so as to be disposed outside the rotor yoke 2.

As described above, in the conventional motor 21, since the indexing magnet 19 is mounted on the outer peripheral surface of the rotor yoke 2 of the motor 21, it is necessary to precisely determine positions of both the indexing magnet and the drive pin provided in the hub base in assembling. When these positions are not determined properly in assembling, magnetic recording properties of the recording unit becomes unstable, which is a problem inherent in the conventional motor.

In addition, since the indexing magnet extends horizontally outward from the outer periphery of the rotor yoke and the magnetic detection device for detecting it is provided on the printed board in the position outside the rotor yoke, it is actually impossible to provide other components on the printed board near the rotor yoke. Consequently, hitherto the printed board is not effectively used in its component-packaging space, and, therefore it is not possible for the motor to cope with the need that the motor should be smaller in size.

SUMMARY OF THE INVENTION

It is a first object of the present invention to provide an outer rotor motor of extremely thin type, which solves the problems inherent in the prior art by mounting a drive pin on a rotor yoke of a motor.

It is a second object of the present invention to provide a small-sized motor easily assembled, in which motor an indexing magnet is integrally formed with a chucking magnet to make it possible to precisely determine the positions of a drive pin and the indexing magnet relative to each other.

The above first object of the present invention is accomplished by providing:

An outer rotor motor having a construction in which a hub base is provided in a central portion of an upper surface of the motor; a chucking magnet for carrying a disk is provided in the vicinity of the hub base; a rotating shaft or spindle of the motor is press-fitted to a central hole of the hub base of a rotor yoke which is provided with a permanent magnet in its outer peripheral portion; the spindle is supported by an inner ring of a ball bearing having its outer ring press-fitted to a central boss of a bearing housing in which the boss is formed in a central portion of its base, a ring-like rib is concentrically formed around the boss to form a circumferential groove between the boss and the rib, and a central hub of a stator is mounted on the rib; a leaf spring is provided in a position above the circumferential groove of the bearing housing placed under the hub base of the rotor yoke; and a drive pin is provided in a free end of the leaf spring so as to resiliently extend upward from an upper surface of the hub base due to its resiliency through a through-hole formed in the hub base.

The second object of the present invention is accomplished by providing:

An outer rotor motor having a construction in which: a hub base (which is provided with a hole press-fitted to a rotating shaft of the motor) and a chucking magnet (which is disposed in a position adjacent to the hub base to support a disk thereon) are provided in a central portion of a chucking base provided with a drive pin which is extended from a hole of the hub base or a hole of the chucking magnet by means of a leaf spring mounted on a surface of the chucking magnet; and an indexing magnet is integrally formed with the chucking magnet.

The same object of the present invention is accomplished by providing:

An outer rotor motor having a construction in which: a spindle (which is supported by a ball bearing disposed inside a bearing housing mounted on a printed board forming a base) is inserted into both of a central portion of a hub base (which is provided with a chucking magnet in its outer peripheral portion) and a central portion of a rotor yoke; an indexing magnet is integrally formed with the chucking magnet; and a magnetic detection device for detecting the arrival of the indexing magnet is provided in the printed board.

DESCRIPTION OF THE PREFERRED EMBODIMENTS

The present invention will be described in detail with reference to FIGS. 1 to 3 and FIGS. 8 to 13.

Figure 1:
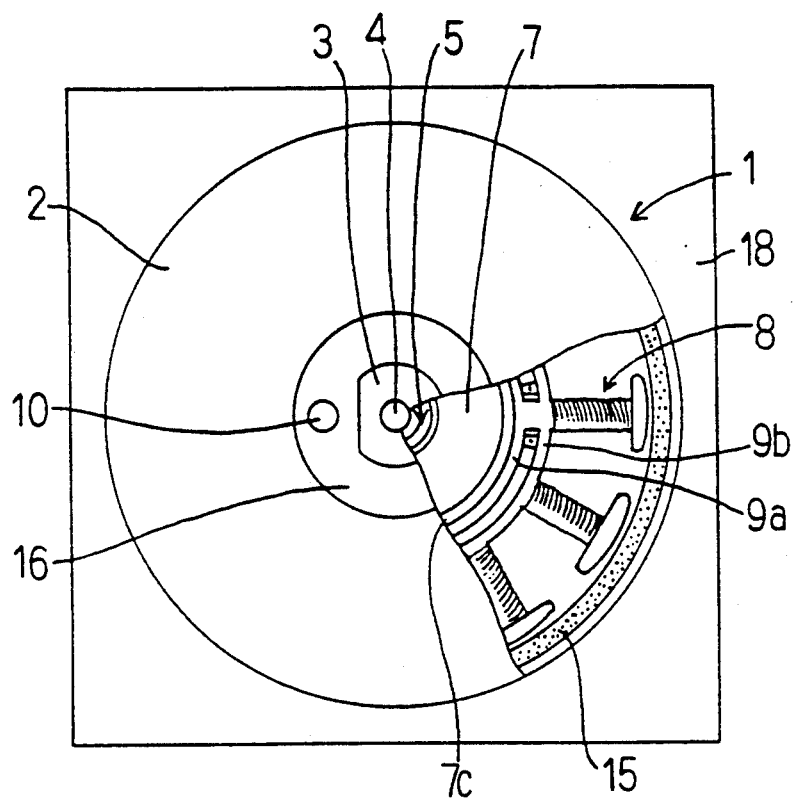
FIG. 1 is a partially broken plan view of an example of the outer rotor motor of the present invention in which the hub base, chucking magnet and the drive pin are mounted on the rotor yoke.
Figure 2:
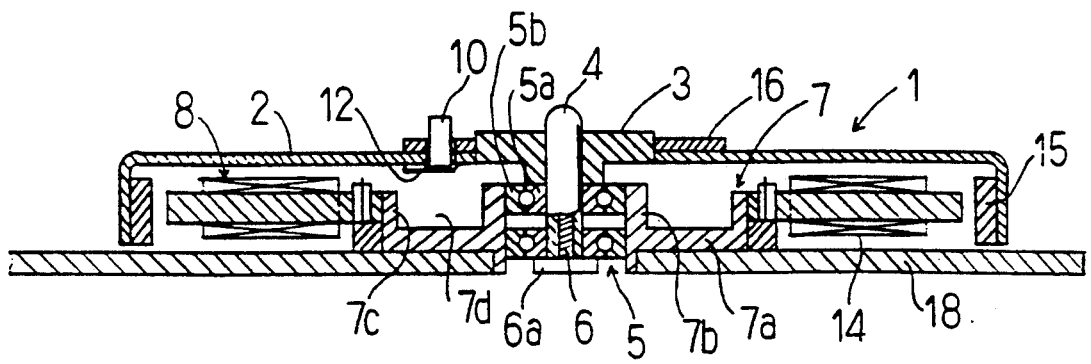
FIG. 2 is a longitudinal sectional view of the same motor.
Figure 3:
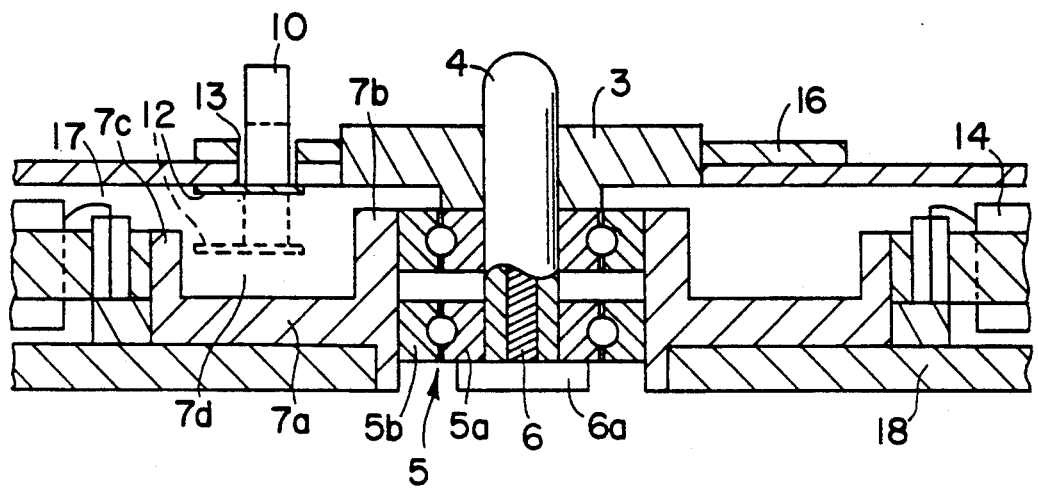
FIG. 3 is a partially enlarged longitudinal sectional view of the same motor.
Figure 4:
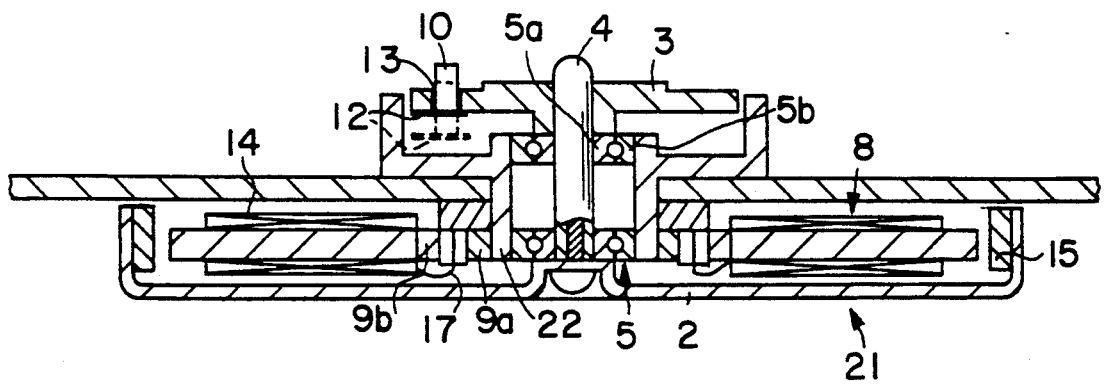
FIG. 4 is a longitudinal sectional view of the conventional motor.
Figure 5:
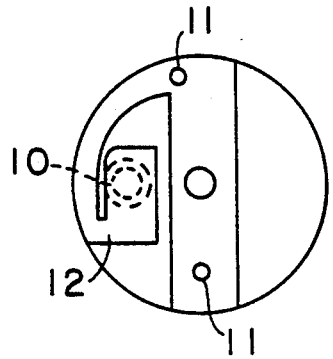
FIG. 5 is a bottom view of the hub base for the same motor.
Figure 6:
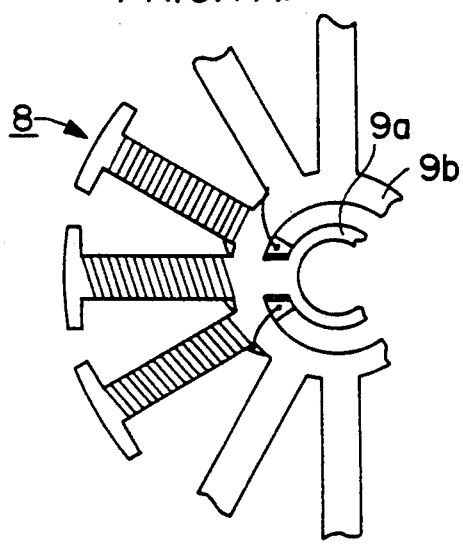
FIG. 6 is a plan view of an essential part of the stator.
Figure 7:
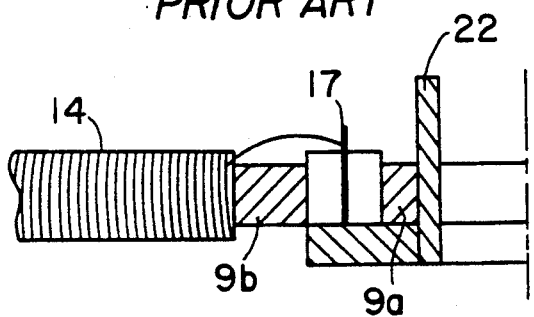
FIG. 7 is a longitudinal sectional view of an essential part of the stator.

FIGS. 1 to 3 show an embodiment of an outer rotor motor of the present invention for accomplishing the first object of the present invention.

In the motor 1 of this embodiment: a hub base 3 is provided in a central portion of a rotor yoke 2 which is provided with a rotor magnet 15 in its outer peripheral flange made of a soft magnetic material; a chucking magnet 16 for holding a disk is disposed in a position adjacent to the hub base 3; and a central portion of the hub base 3 is press-fitted to a rotating shaft or spindle 4 of the motor.

The spindle 4 is inserted into an inner ring 5a of each of a pair of radial ball bearings 5 each of which is constructed of an inner ring 5a and an outer ring 5b. The inner rings 5a are sandwiched between a lower surface of a head of a screw 6 (which is threadably connected with a lower end of the spindle 4) and a lower surface of the hub base 3, and are supported by bearing balls.

The outer ring 5b of each of the bearings 5 is supported by a bearing housing 7 having a unique construction.

Namely, the bearing housing 7 is constructed of: a boss 7b provided in the central portion of a base 7a; and a ring-like rib 7c which extends radially outward from the boss 7b and is concentrically formed with the same boss 7b to form a circumferential groove 7d (which forms a leak space) therebetween. The boss 7b is press-fitted to the outer ring 5b of each of the bearings 5 to support these bearings 5. A stator 8 of the motor is provided with double stator hubs 9a, 9b in its central portion, the inner one 9a of which hubs 9a, 9b is press-fitted to the rib 7c to have the stator 8 mounted on the bearing housing 7.

In this embodiment, as is in the prior art, a drive pin 10 is fixedly mounted on a free end of a leaf spring 12 which has its base portion fixedly mounted on an inner (or lower) surface of the rotor yoke 2 by means of screws 11 and like fasteners, so that the drive pin 10 is adapted: to resiliently extend upwardly from the rotor yoke 2 through a through-hole 13 (which is formed in the rotor yoke 2) due to the resiliency of the leaf spring 12; and to be over the circumferential groove 7d of the bearing housing 7.

Incidentally, in the drawings, the reference numeral 18 denotes a printed board provided with a hole in which a lower portion of the boss 7b of the bearing housing 7 is fixedly mounted so that the bearing housing is mounted on the printed board 18.

In the motor of this embodiment, by energizing coils 14 of the stator 8, the rotor yoke 2 is rotatably driven.

When the disk is placed in a reference position on the hub base 3 of the rotor yoke 2, the drive pin 10 is engaged with a reference hole of the disk (which hole is formed in a hub of the disk) thus allowing the disk to be rotatably driven by the hub base 3 together with the rotor yoke 2.

On the other hand, when the disk is not placed in the reference position of the hub base 3, the disk depresses the drive pin 10 against the resiliency of the leaf spring 12.

As a result, though the leaf spring 12 is resiliently bent towards a lower side of the rotor yoke 2, it is possible for the rotor yoke 2 to rotate without any interference since the circumferential groove 7d of the bearing housing is so formed under the leaf spring 12 to allow the thus bent leaf spring 12 to enter the circumferential groove 7d.

When the thus rotated rotor yoke 2 brings the hub base 3 back to a position corresponding to the reference position of the disk, the drive pin 10 is engaged with the reference hole of the disk under the influence of the resiliency of the leaf spring 12 thus allowing the disk to be rotatably driven together with the rotor yoke 2.

In the motor of this embodiment, since the hub base 3, chucking magnet 16 and the drive pin 10 are mounted on the rotor yoke 2, it is possible to reduce the overall height of the motor.

Further, since the bearing housing 7 supporting the spindle 4 of the rotor yoke 2 is provided with the circumferential groove 7d in its upper surface allowing the drive pin 10 to enter the circumferential groove 7d at a time when the leaf spring carrying the drive pin 10 is resiliently bent downward under the load of the disk, it is possible to reduce the height of the motor's main body, for example, by approximately half the height (which is approximately 35.4 mm) of the conventional motor's main body, which makes it possible to provide an outer rotor motor of very thin type which fits the needs of today.

FIGS. 8 to 13 show various motors of the present invention in each of which an indexing magnet 19 is integrally formed with the chucking magnet 16.

Figure 8:
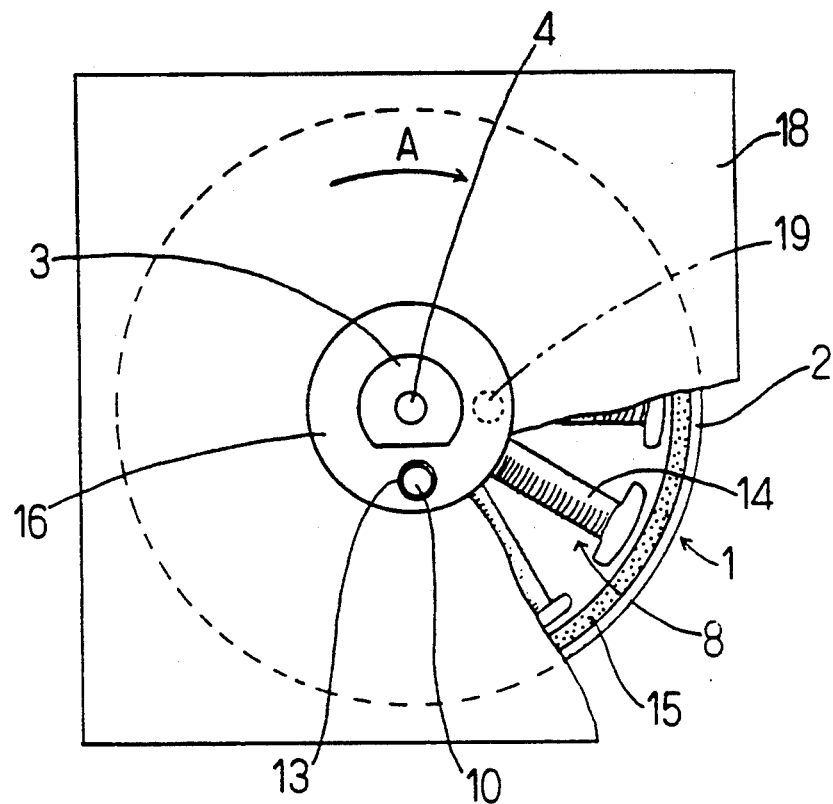
FIG. 8 is a partially broken plan view of an example of the motor of the present invention in which the indexing magnet is integrally formed with the chucking magnet.
Figure 9:
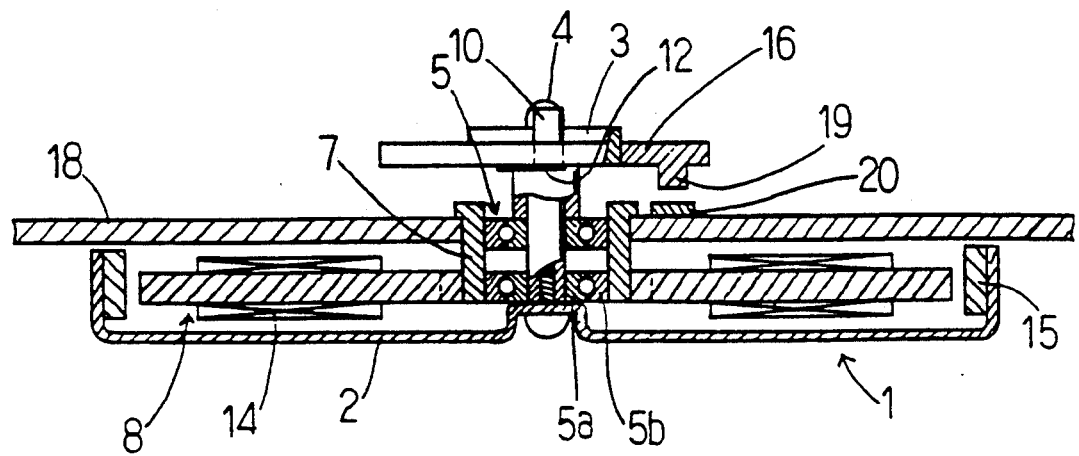
FIG. 9 is a longitudinal sectional view of the same motor.

FIGS. 8 and 9 show an example of such various motors of the present invention, in which: the spindle 4 of the outer rotor motor 1 is press-fitted to the hub base 3. In a position adjacent to the hub base 3, there is provided the chucking magnet 16 on the lower surface of which an indexing magnet 19 of round-bar type is integrally molded with the chucking magnet 16 so as to extend outward from the lower surface of the chucking magnet 16.

A through-hole 13, through which the drive pin 10 passes to extend upward from an upper surface of the chucking magnet 16, is formed in the chucking magnet 16 at a position spaced apart from the indexing magnet 19 by an angle of 87 in a circumferential direction indicated by the arrow "A".

The drive pin 10 is fixedly mounted on the free end of the leaf spring 12 having its base end fixedly mounted on the lower surface of the hub base 3, and is urged by the resiliency of the leaf spring 12 to extend above the upper surface of the chucking magnet 16 through the through-hole 13 thereof, so that the drive pin 10 engages with the reference hole of a disk to rotatably drive the disk.

A magnetic detection device 20 for detecting a magnetic force of the indexing magnet 19 to determine a recording start reference position of the disk is provided in the print board 18 so as to be placed in a position immediately under the circular path of the indexing magnet 19 which is rotatably driven together with the chucking magnet 16.

The hub base 3 provided with the chucking magnet 16 is press-fitted to its rotating shaft or spindle 4 in a position oppositely disposed from the rotor yoke 2.

In the construction of the motor 1: the rotor yoke 2 provided with an outer peripheral flange having a rotor magnet 15 made of a soft magnetic material is provided in a lower end of the spindle 4; the spindle 4 is press-fitted to the inner rings 5a of the radial ball bearings 5 each of which is constructed of the inner rings 5a and the outer rings 5b; and, the outer rings 5b are held by the bearing housing 7 which is press-fitted to the hole formed in the printed board 18.

Figure 10:
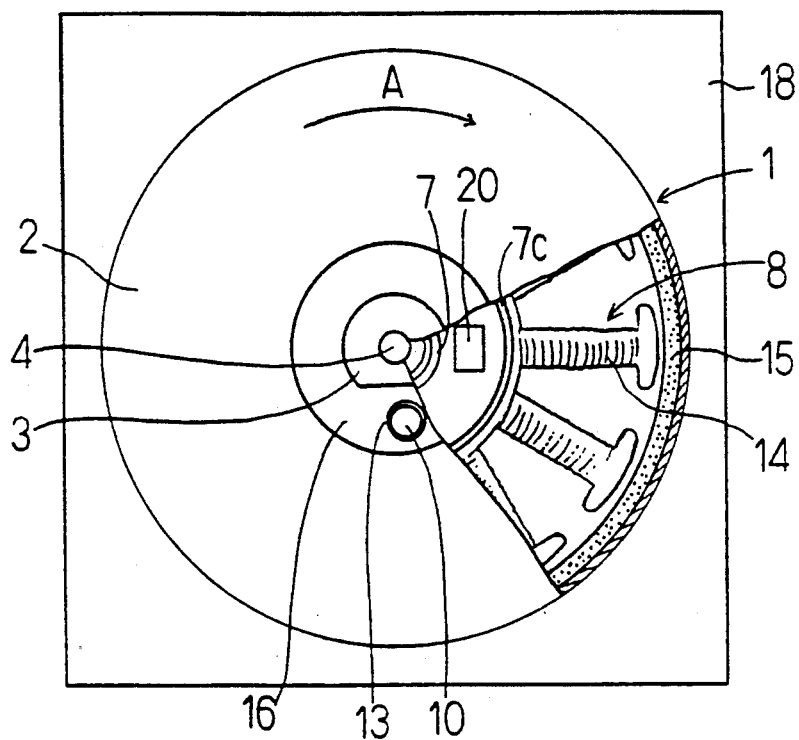
FIG. 10 is a partially broken plan view of another embodiment of the same motor.
Figure 11:
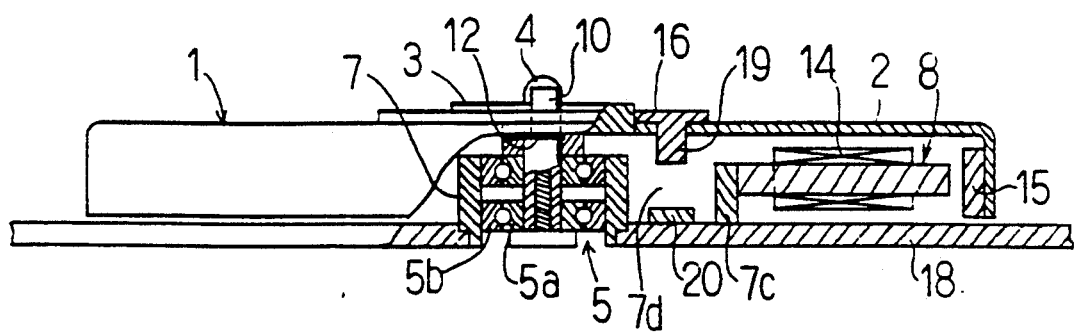
FIG. 11 is a longitudinal sectional view of an essential part of the same motor.

FIGS. 10 and 11 show another embodiment of the motor 1 having been modified to be of thin type by providing the chucking magnet 16 described above in a central portion of the rotor yoke 2 of the motor 1.

In this embodiment: the rotor yoke 2 provided with the rotor magnet 15 in its outer peripheral flange is provided with the hub base 3 in its central portion, and the chucking magnet 16 (which is adapted to carry the disk) in a position adjacent to the hub base 3; and a central portion of the hub base 3 is press-fitted to the rotating shaft or spindle 4.

In a lower surface of the chucking magnet 16, there is provided the indexing magnet 19 of round-bar type which is integrally molded with the chucking magnet 16, so allowing the indexing magnet 19 to extend downward from the lower surface of the chucking magnet 16 through a hole formed in the rotor yoke 2.

The spindle 4 is press-fitted to the inner rings 5a of the radial ball bearings 5 which have their outer rings 5b press-fitted to the bearing housing 7.

The lower end of the housing 7 is press-fitted to the hole of the printed board 18 which is provided respect to the rib 7c concentrically formed with the housing 7 thus allowing the circumferential groove 7d to be formed between the housing 7 and the rib 7c. The central hub of the stator 8 is press-fitted to the rib 7c.

The indexing magnet 19 extending from the lower surface of the rotor yoke 2 is rotated together with the chucking magnet 16 in the circumferential groove 7d. On the other hand, the magnetic detection device 20 constructed of Hall device for detecting the magnetism of the indexing magnet 19 is provided in the circumferential groove 7d of the printed board so as to be immediately under the circular path of the indexing magnet 19.

Figure 12:
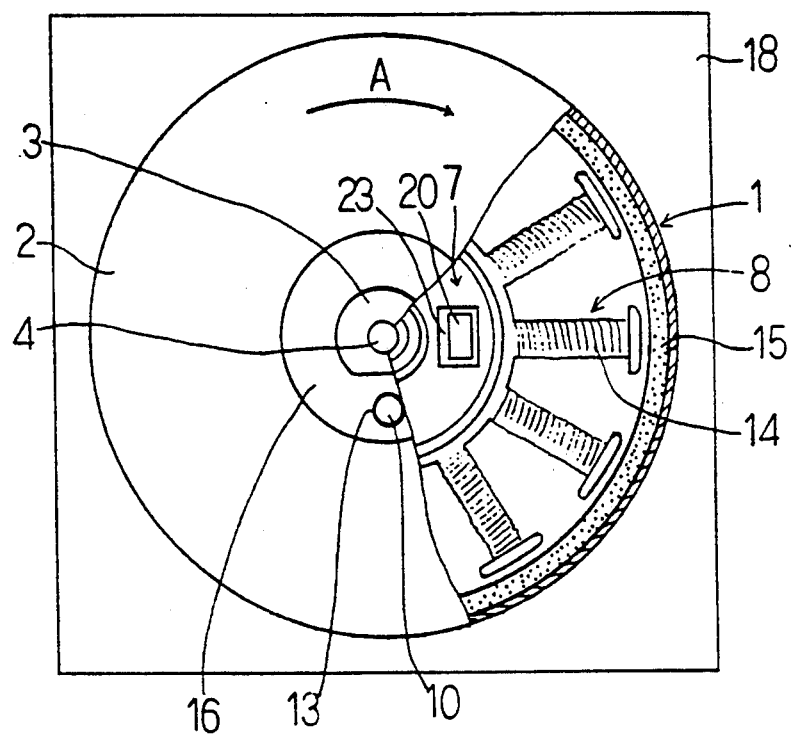
FIG. 12 is a partially broken plan view of further another embodiment of the same motor.
Figure 13:
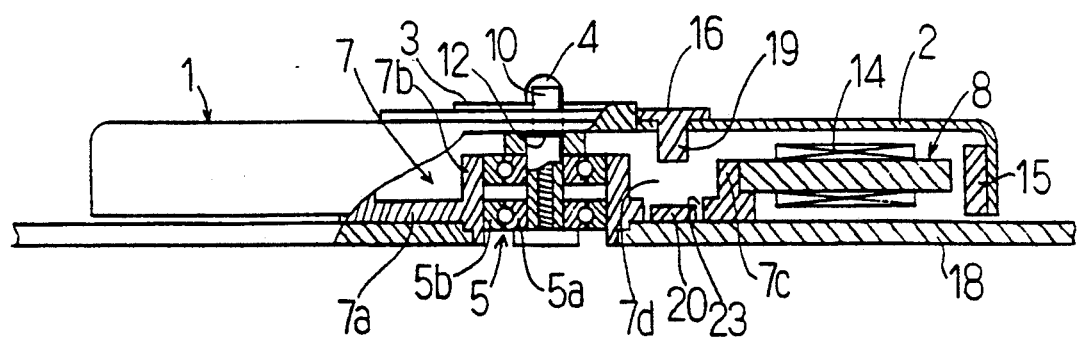
FIG. 13 is a longitudinal sectional view of an essential part of the same motor.
Figure 14:
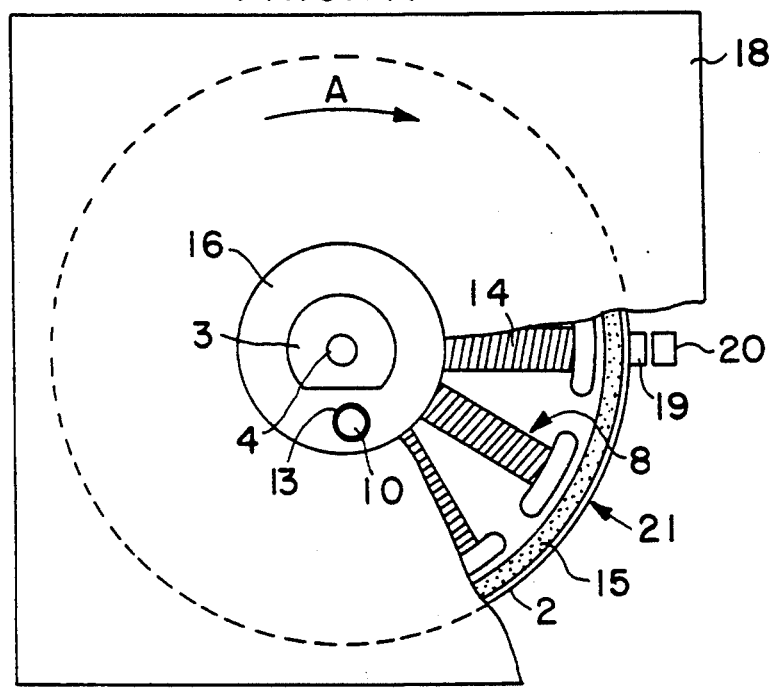
FIG. 14 is a partially broken plan view of a conventional motor.
Figure 15:
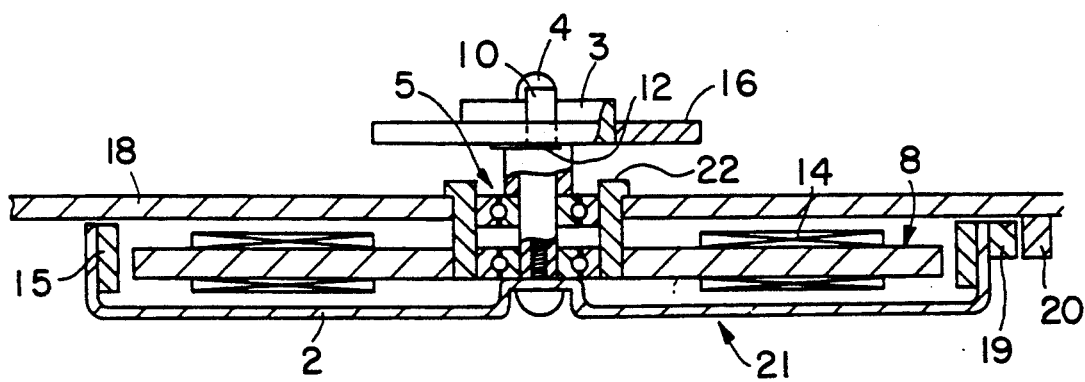
FIG. 15 is a longitudinal sectional view of the same motor.

FIGS. 12 and 13 show another embodiment of the motor 1 in which the indexing magnet 19 is integrally formed with the chucking magnet 16. In this embodiment, the bearing housing 7 has a unique construction to permit the motor 1 to be of a thin type.

Namely, in this embodiment: the boss 7b of the bearing housing 7 is provided in the central portion of the housing base 7a; a ring-like rib 7c concentrically formed with the boss 7b is integrally formed with the outer peripheral portion of the housing base 7a, so allowing the circumferential groove 7d to be formed between the boss 7b and the rib 7c; the boss 7b is press-fitted to the outer rings 5b of the bearings 5 to support the bearings 5; and, the rib 7c is press-fitted to the hub of the stator 8.

Thus, the indexing magnet 19 is extended downward from the hole (which is formed in the rotor yoke 2) so as to enter the circumferential groove 7d. On the other hand, the magnetic detection device 20 is provided in a notch hole (i.e., packaging hole formed in a suitable portion, for example such as the bottom of the circumferential groove 7d, as shown in the drawings) so as to be brought into contact with the printed board 18.

In this embodiment, the indexing magnet 19 is constructed of a round bar a suitable L/A ratio of which (where "L" is a height, and "A" is a cross sectional area of the bar) is equal to or more than 1.0. By employing the above construction, it is possible for the indexing magnet 19 to reduce its magnetic resistance and to substantially prevent the reduction of its magnetism at a low temperature.

Further, in the above embodiments, although the chucking magnet 16 is integrally formed with the hub base 3, it is also possible to separately provide them so as to be concentrically arranged with the spindle 4 in the rotor yoke 2.

In these embodiments, there is no fear that the indexing magnet 19 is misaligned with the drive pin 10 in assembling, which enables the motor to detect the recording start reference position of the disk in a very precise manner and to show more stable magnetic recording properties.

Further, in the present invention, it is not required to provide the magnetic detection device in the outer side of the rotor yoke in the printed board 18, which makes it possible to effectively use a space on the printed board and to compactly package components of the motor, thus allowing the recording unit of the motor to be of a smaller type. These are advantages inherent in the present invention.

What is claimed is:

1. An outer rotor motor for driving a magnetic disk comprising
   (a) a rotatable spindle (4),
   (b) a bearing housing (7) which surrounds the lower part of said spindle (4) and supports said spindle for rotation, the bearing housing (7) comprising an inner portion (7b) that contains ball bearings (5),
   (c) a print board (18) extending outwardly from the lower part of said bearing housing (7),
   (d) a ring-like rib (7c) located at a spaced distance outwardly from said inner portion (7b) of the bearing housing so as to thereby establish a circumferential groove (7d) between said inner portion (7b) and said ring-like rib (7c),
   (e) a hub base (3) mounted on the upper portion of said spindle (4) above said bearing housing (7) and which is fixed on said spindle so as to rotate with said spindle (4),
   (f) a chucking magnet (16) mounted on and outwardly from said hub base (3) so as to rotate with both said hub base (3) and said spindle (4), said chucking magnet being adapted to support a magnetic disc on its upper surface, said chucking magnet containing a hole that is adapted to receive a pin (10),
   (g) a rotor yoke (2) joined to and extending outwardly from said hub base (3) so that it also rotates with said spindle (4), said rotor yoke (2) containing a hole that is adapted to receive a pin (10),
   (h) a stator (8, 14) mounted outwardly of said ring-like rib (7c),
   (i) a leaf spring (12) mounted on the lower surface of either said rotor yoke (2) or said hub base (3), the leaf spring (12) having one end that is fixed and one end that is free, and
   (j) a drive pin (10) mounted above said circumferential groove (7d) on said free end of said leaf spring (12) and positioned so that the pin (10) will be resiliently biased upwardly through said aligned holes in said rotor yoke (2) and chucking magnet (16).

2. An outer rotor motor according to claim 1 wherein said ring-like rib (7c) is an outward extension of said bearing housing (7).

3. An outer rotor motor according to claim 1 wherein said ring-like rib (7c) is a rib-element that extends upwardly from said printed board (18) and which is generally parallel to the inner portion (7b) of said bearing housing (7) and at a spaced distance therefrom.

4. An outer rotor motor according to claim 1 wherein an indexing magnet (19) is formed integrally with said chucking magnet (16) and extends downwardly through said rotor yoke (2) into said circumferential groove (7d).

5. An outer rotor motor according to claim 9 wherein a magnetic detection device (20) for detecting the arrival of said indexing magnet (19) is mounted adjacent the bottom of said circumferential groove (7d).

* * * * *